(12) United States Patent
GO

(10) Patent No.: US 12,743,887 B1
(45) Date of Patent: Sep. 22, 2026

(54) METHOD AND SYSTEM FOR PATIENT MONITORING AND INTERVENTION

(71) Applicant: MetaCare Inc., Loganville, GA (US)

(72) Inventor: Jarmaine Jourdan GO, Chino Hills, CA (US)

(73) Assignee: MetaCare Inc., Loganville, GA (US)

( * ) Notice: Subject to any disclaimer, the term of this patent is extended or adjusted under 35 U.S.C. 154(b) by 0 days.

(21) Appl. No.: 18/817,929

(22) Filed: Aug. 28, 2024

Related U.S. Application Data

(60) Provisional application No. 63/534,894, filed on Aug. 28, 2023.

(51) Int. Cl.

| | |
|---|---|
| ***G08B 21/00*** | (2006.01) |
| ***G06T 7/70*** | (2017.01) |
| ***G06V 10/26*** | (2022.01) |
| ***G06V 20/52*** | (2022.01) |
| ***G06V 40/10*** | (2022.01) |
| ***G08B 21/02*** | (2006.01) |

(52) U.S. Cl.
CPC ................ *G06V 20/52* (2022.01); *G06T 7/70* (2017.01); *G06V 10/26* (2022.01); *G06V 40/10* (2022.01); *G08B 21/02* (2013.01); *G06T 2207/30004* (2013.01); *G06T 2207/30196* (2013.01); *G06T 2207/30232* (2013.01)

(58) Field of Classification Search
CPC ........ G06V 20/52; G06V 10/26; G06V 40/10; G06T 7/70; G06T 2207/30004; G06T 2207/30196; G06T 2207/30232; G08B 21/02
USPC ...................................................... 340/573.1
See application file for complete search history.

(56) References Cited

U.S. PATENT DOCUMENTS

2012/0314901 A1* 12/2012 Hanson ................ G08B 21/043 600/595
2013/0127620 A1* 5/2013 Siebers ................ A61B 5/1113 340/573.1
2013/0184592 A1* 7/2013 Venetianer ............. G06T 7/246 600/476
2015/0199892 A1* 7/2015 Johnson ................ G08B 31/00 348/77
2017/0358195 A1* 12/2017 Bobda .............. G08B 13/19613
2022/0280075 A1* 9/2022 Johnson ................ G06V 20/54
2023/0074123 A1* 3/2023 Celi ........................ G06T 7/248
2023/0140093 A1* 5/2023 Cheng ...................... G06N 3/09 340/573.1
2023/0222887 A1* 7/2023 Muhsin ................ G06V 40/168

* cited by examiner

*Primary Examiner* — Mark S Rushing
(74) *Attorney, Agent, or Firm* — Jeffrey D. Mulrooney

(57) ABSTRACT

A patient monitoring and intervention system and methods of using said system and more particularly pertains to a camera system with machine learning and artificial intelligence methods enabled to detect likely adverse events, in particular falls, and to alert care staff and in some embodiments to prevent a fall by activating a fall prevention or mitigation device.

10 Claims, 3 Drawing Sheets

METHOD AND SYSTEM FOR PATIENT MONITORING AND INTERVENTION

CROSS-REFERENCE TO RELATED APPLICATION

This application is based on and claims priority to U.S. Provisional Patent Application No. 63/534,894 filed Aug. 28, 2023, entitled "Method and System for Patient Monitoring and Intervention".

BACKGROUND OF THE INVENTION

The present invention relates to a patient monitoring, intervention and documentation system and methods of using said system and more particularly pertains to a camera system with machine learning and artificial intelligence methods enabled to document events such as staff visits, trips to the bathroom and other events of interest and utilizing human intervention to prevent likely adverse events, such as falls, elopements, flailing in bed and other events of interest by alerting the remote monitoring center staff to prevent a fall or other event of interest by speaking with the patient/resident using two way audio, turning on a light or other device, messaging the on-site care staff by text, phone call, email or other communication method or by activating a fall prevention or mitigation device.

Prior art systems and methods in the field of patient monitoring do not provide human intervention to accomplish alert verification and prevention measures, such as speaking with the patient/resident, notifying care staff, activating an inflatable membrane or other mitigation device to keep a patient in their bed or to cushion their fall in addition to documenting and reporting the events. An object of the present invention is to eliminate or at least mitigate the above shortcomings in the art.

SUMMARY OF THE INVENTION

The present invention in at least one embodiment is a patient monitoring and alert system that uses one or more digital video cameras to gather information and act as sensors to determine a state of a patient and their likelihood of an adverse event such as a fall, elopement or other event of interest. In some preferred embodiments the present invention will notify and enable the remote monitoring staff to evaluate the incident and if necessary, intervene when an adverse event is predicted to be likely to occur or has been detected. These interventions include calling local staff to assist or check in on the patient; using a speaker to encourage the resident to not stand and encourage the resident to stay in bed while help arrives; and activate a device such as an inflatable bladder to keep the patient from falling or to cushion a fall. In preferred embodiments the camaras are connected to a computer system running machine learning and/or artificial intelligence ("AI") software that uses a database of visual data to compare outcomes and therefrom form a predictive model of when an event, staff visit, elopement, visitor or other event is imminent or has occurred. The comparing of visual data can be cross referenced with human observations to teach the AI software which can include correcting false positives and false negatives.

In more advanced embodiments it is envisioned that software and artificial intelligence will be able to use one or more camera feeds and will be able to supplement or even replace the need for a person to monitor any camera feeds.

Detection of undesired movement may be assisted by Artificial Intelligence, designed to alert the remote operator to the potential of an event and allowing for timely intervention. For the purpose of this disclosure, the video cameras include image sensors but could also include motion detector technology that does not require visible light, for example infrared sensors, ultrasonic sensors, and microwave motion sensors to enable motion monitoring in the dark. Other inputs could also be used to predict that a patient may be in danger of having an unwanted event that may lead to a fall or elopement. For example, electroencephalogram (EEG), electrodermal activity (EDA), and/or electrocardiogram (ECG) could be used to measure data related to a patient and the inflatable cylinders could be deployed to prevent a potential fall. It is envisioned that>>>>

DETAILED DESCRIPTION OF THE INVENTION

Figure 1:
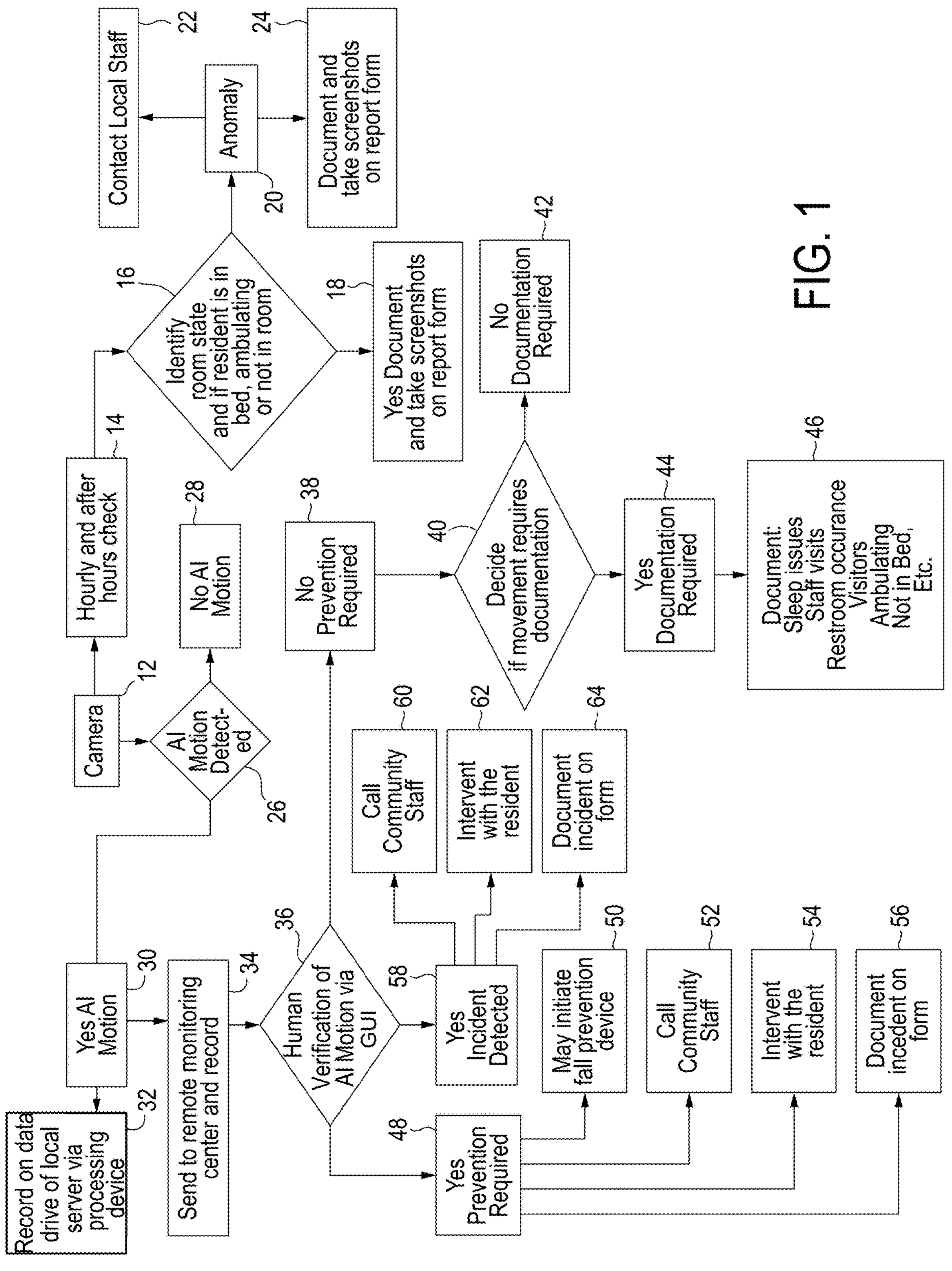
FIG. 1 depicts a flowchart of the overall method of the present invention.

Prior to proceeding with the more detailed description of the present invention it should be noted that, for the sake of clarity, identical components which have identical functions have been designated by identical reference numerals throughout the several views illustrated in the drawings.

Figure 2:
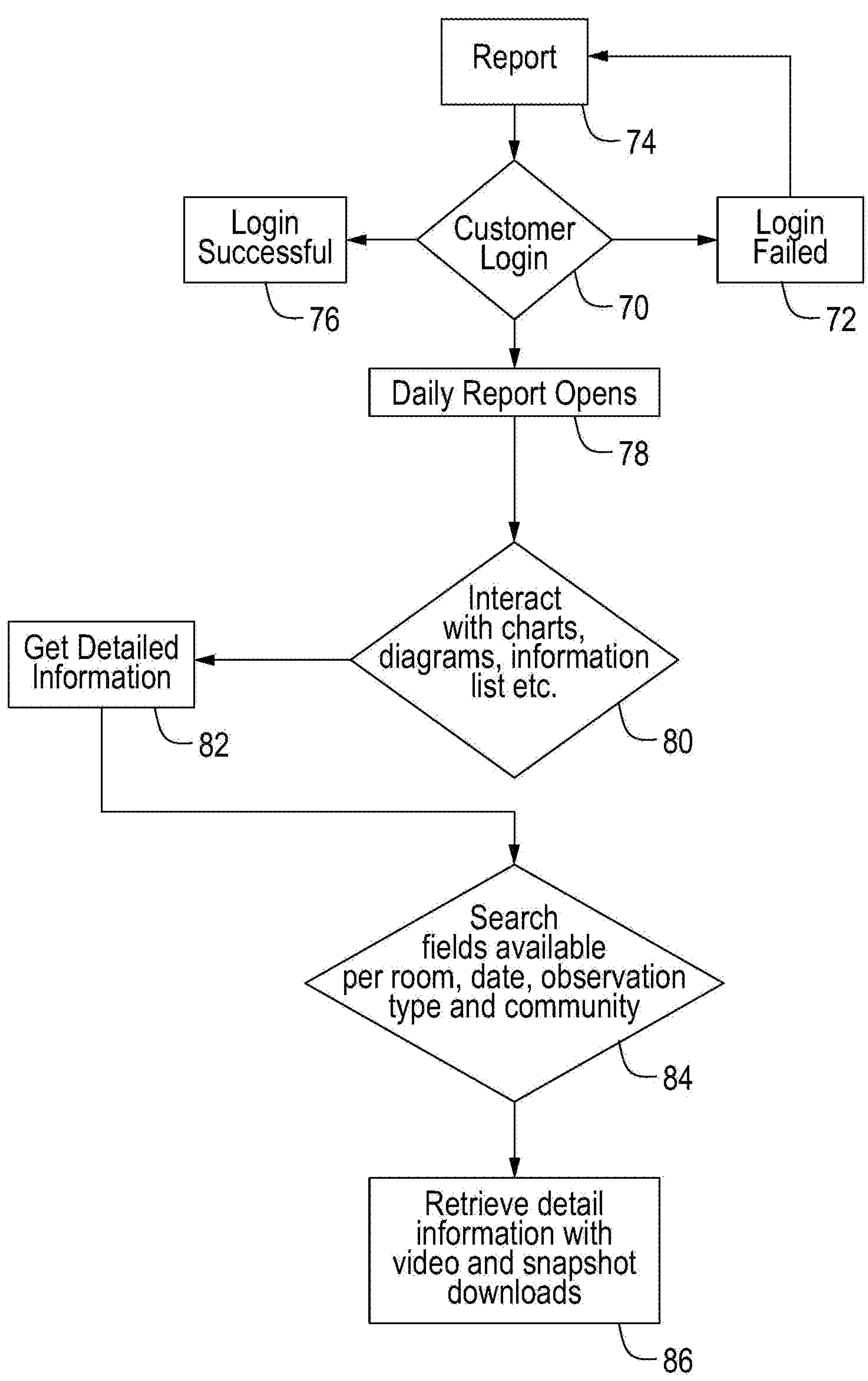
FIG. 2 depicts a flowchart of a process for interfacing with a report system.
Figure 3:
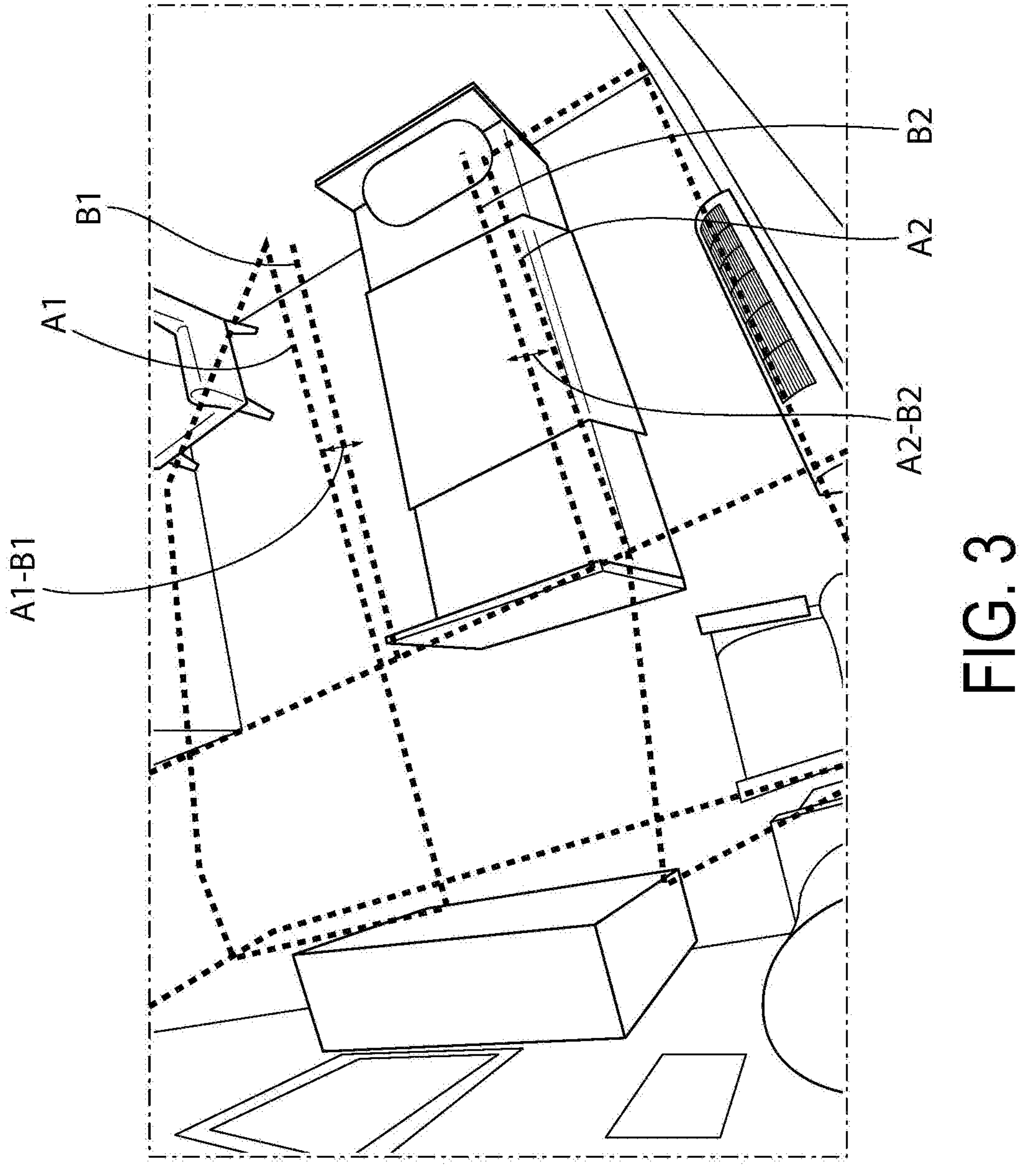
FIG. 3 depicts an example of a room a resident/patient may occupy showing projection lines developed by the system of the present invention.

Referring to FIGS. 1-3, and in particular FIG. 1, in a first aspect the present invention provides a method, generally designated 10, including digital video camera 12 which conducts periodic checks 14 to identify the state of a room and if resident/patient is in bed, ambulating or not in room 16. If the answer to 16 is yes, then the status is documented via screen captures of the video and entered into a report 18. If at 16 an anomaly is detected 20, then local staff is alerted 22 and the status is documented via screen captures of the video and entered into a report 24.

Still referring in particular to FIG. 1, camera 12 is equipped with an AI motion detection feature 26 that when no motion is detected 28 does nothing further in this process. When motion is detected 30 it is recorded on a local server 32 (via a processing device and data drive) and sent to a remote monitoring center 34 as well as being recorded remotely. At the remote monitoring center 34 a person reviews the record and verifies if action is needed 36 via a graphical user interface (GUI). If no intervention is required or no other defined activity is detected 38, then a decision is made on whether if the detected event or incident requires documentation 40. If it is decided no documentation is required 42, then the process stops. If it is decided that documentation is required 44, then a record is made of any sleep issues, staff visits, restroom occurrence, visitors, ambulating, person is not in bed, or any other event that relates to the detected movement or alert 46 thereby ending this cycle of the process.

Still referring in particular to FIG. 1, if at the human verification step 36 it is decided fall intervention is required 48, then one or more of the following may be triggered based on the circumstances: initiate fall prevention device 50, call community staff 52, intervene with the resident/patient 54, and document the incident 56. The fall prevention device in step 50 can be an inflatable device that when triggered prevents the resident/patient from falling. The intervention with resident/patient in step 54 could include using an intercom to communicate with the resident/patient.

Still referring in particular to FIG. 1, if at the human verification step 36 it is decided that a fall or other defined event is detected 58, then one or more of the following may be triggered based on the circumstances: call community staff 60, intervene with the resident/patient 62, and document the incident 64.

Referring in particular to FIG. 2, FIG. 2 shows the method process for interfacing with a report system that shows the activities that occurred in the rooms of each resident/patient for each period (hourly, daily, weekly, etc.). First customer login credentials are requested 70. If the login credentials do not match, then the login fails 72, the failure is reported 74, and returned to login 70. Upon successful login 76 the daily report opens 78. The customer can then interact with charts, diagrams, information list, etc. 80, obtain detailed information 82, search fields available per room, date, observation type and community 84, and retrieve detailed information with video and snapshot downloads 86.

Referring in particular to FIG. 3, FIG. 3 shows an example of a room a resident/patient may occupy. The system detects lines A1, A2, B1, and B2 and areas that it expects a person to be and if the person is in a position or location of potential concern, it will notify a monitoring center staff member to report and potentially take action as detailed above. The monitoring center staff could include nurses, doctors or other healthcare workers. The AI software is able to identify the location of body parts in relation to other body parts and the location in the room and uses this information to determine the state of the patient/resident, including if they are likely to fall or have fallen; they are likely to have a seizure or are having a seizure; if they are restless; or other defined activity or lack of activity. In order to accomplish these goal, the system will detect movement across directional lines A1-B1 and A2-B2. The system can develop addition lines to form zones to quantify and qualify behaviors and incidents of interest. Once verified by a human these flagged incidents can then be subject to automatic or human verified interventions which are flagged for review by a human in real time.

While a presently preferred embodiment of the present invention has been described in detail above, it should be understood that various other adaptations and/or modifications of the invention can be made by those persons who are particularly skilled in the art without departing from either the spirit of the invention or the scope of the appended claims.

What is claimed is:

1. A method, comprising:

receiving, by a processing device, image data comprising one or more image frames indicative of a movement of a person;

recording said image data to a data drive;

detecting, by the processing device using an artificial intelligence motion detection model, a potential incident based on the image data;

transmitting the image data to a remote monitoring center for verification by a second person;

receiving, by the processing device, a verification input from the second person confirming the potential incident;

and causing, by the processing device, in response to receiving the verification input, an intervention to prevent the incident.

2. The method of claim 1, further comprising:

segmenting the image data into regions associated with one or more body parts of the person; segmenting the image data into regions associated with one or more areas of a room; determining a first body part location of the person; and identifying a state of the person based at least in part on a location of a body part of the person relative to a region of the room.

3. The method of claim 1, wherein the intervention initiated by the processing device further comprises actions selected from a group consisting of documenting the state of the person; initiating an audio sound in the room from a speaker; and sending a notification to be displayed on a graphical user interface (GUI).

4. A method, comprising:

receiving, by a processing device, image data comprising one or more image frames indicative of a movement of a first person;

recording, by the processing device, the image data to a data drive;

determining, by the processing device, a possibility of a fall by the first person based on identifying a location of a body part of the first person relative to a predefined projection line in a room based on the image data;

transmitting the image data to a remote monitoring center for verification by a second person; receiving, by the processing device, a verification input confirming the possibility of the fall; and causing, by the processing device in response to receiving the verification input, an intervention to prevent the fall.

5. The method of claim 4, further comprising:

segmenting the image data into regions associated with one or more body parts of the person; segmenting the image data into regions associated with one or more areas of a room; determining a first body part location of the person; and identifying a state of the person based at least in part on a location of a body part of the person relative to a region of the room.

6. The method of claim 4, wherein the intervention initiated by the processing device comprises actions selected from a group consisting of documenting the state; and initiating audio sound in the room from a speaker; and triggering a mechanical fall prevention device.

7. A method, comprising:

receiving, by a processing device, image data comprising one or more image frames indicative of a movement of a first person in real time;

recording the image data to a data drive;

detecting, by the processing device using an artificial intelligence motion detection model, a potential incident based on the movement of the first person;

transmitting the image data to a remote monitoring center for display on a graphical user interface (GUI) for verification by a second person;

receiving, by the processing device, a verification input from the second person confirming the potential incident; and causing, in response to receiving the verification input, a notification indicative of the possibility of the incident by the first person to be displayed on a graphical user interface (GUI).

8. The method of claim 7, further comprising:

segmenting the image data into regions associated with one or more body parts of the first person;

segmenting the image data into regions associated with one or more areas of a room;

determining a first body part location of the first person; and identifying a state of the first person based at least in part on a location of a body part of the first person relative to a region of the room.

9. The method of claim 8, further comprising the second person initiating an intervention to prevent the incident based on the state of the first person.

10. The method of claim 9, wherein the intervention initiated by the second person is selected from a group consisting of documenting the state of the person; initiating an audio sound in the room from a speaker; and triggering an incident prevention device.

* * * * *